United States Patent Office 3,098,083
Patented July 16, 1963

3,098,083
2α-METHYL-11-OXYGENATED-5α-ANDROSTANES
John C. Babcock, Portage Township, Kalamazoo County,
J Allan Campbell, Kalamazoo Township, Kalamazoo
County, and Raymond L. Pederson, Kalamazoo, Mich.,
assignors to The Upjohn Company, Kalamazoo, Mich.,
a corporation of Michigan
No Drawing. Filed Dec. 9, 1957, Ser. No. 701,348
4 Claims. (Cl. 260—397.45)

The present invention relates to novel steroid compounds and is more particularly concerned with 2α-methyl - 3 - oxygenated - 11 - oxygenated - 17 - oxygenated-5α-androstane compounds and to processes for the production thereof.

The novel compounds of the present invention may be represented by the following formula:

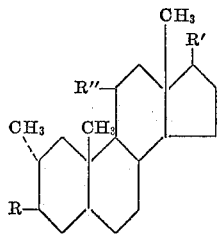

wherein R is selected from the group consisting of

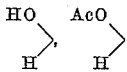

wherein Ac is the acyl radical of an organic carboxylic acid, preferably a hydrocarbon carboxylic acid containing from one to twelve carbon atoms, inclusive, and keto; wherein R' is selected from the group consisting of

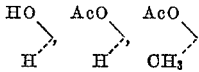

wherein Ac is as above defined,

and keto; and wherein R" is β-hydroxy or keto.

It is an object of the invention to provide the novel 2α-methyl-3-oxygenated-11-oxygenated-17-oxygenated-5α-androstane compounds, particularly the 2α-methyl-5α-androstane compounds represented by Formula I wherein R is a ketone or a free or esterified hydroxyl and wherein R' is a ketone or a hydroxyl or a hydroxyl and methyl group, the hydroxyls being either free or esterified, and wherein R" is β-hydroxy or keto. It is a further object of this invention to provide the methods for the production of the novel compounds of this invention. Other objects of the present invention will be apparent to those skilled in the art to which this invention pertains.

The compounds of the present invention, compounds represented by Formula I, are valuable therapeutic agents. They exhibit anabolic-androgenic, progestational and gonadotropin inhibiting properties. They are especially useful as anabolic-androgenic agents and are of particular advantage in cases where selective anabolic activity is required because of their favorable anabolic-androgenic ratio. For example, 2α,17α-dimethyl-11β,17β-dihydroxy-5α-androstan-3-one was found to have an oral anabolic activity of 70 percent of methyltestosterone and an androgenic activity of 31 percent of methyltestosterone. The novel compounds of this invention, because of their anabolic activity, are useful in increasing weight, muscle strength, and for increasing the sense of well-being and positive nitrogen balance in pituitary deficiencies. A favorable anabolic response can be achieved without noticeable androgenic response owing to the high anabolic-androgenic ratio. These compounds can be prepared and administered in a wide variety of oral or parenteral dosage forms singly, or in admixture with other coacting compounds. They can be associated with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

The process of the instant invention comprises reduction of the 4-double bond of a 2α-methyl-11-oxygenated-17-oxygenated-4-androsten-3-one starting material with a metal such as lithium in liquid ammonia or with hydrogen in the presence of a palladium catalyst to produce the corresponding saturated 5α-androstane compounds. Reduction of these compounds with sodium borohydride produces the corresponding 3-hydroxy compounds which on acylation are productive of the 3-esters thereof. During the acylation step, a 17β-hydroxyl, when present, will also by acylated and thereby be productive of the corresponding 3,17-diacylates. Similarly, acylation of the 2α-methyl-3-keto compounds (before reduction with sodium borohydride) wherein a 17-hydroxyl is present, is productive of the corresponding 17-acylates.

Starting material for the production of the compounds of the present invention are the 11β-hydroxy and 11-keto analogues of 2α-methyltestosterone, 2α-methyl-4-androstene-3,17-dione, and 2α,17α-dimethyltetosterone. These starting compounds can be prepared by methylating 11β-hydroxytestosterone, 11-ketotestosterone, 11β-hydroxy-4-androstene-3,17-dione, 4-androstene-3,11,17-trione, 11β-hydroxy-17α-methyltestosterone, and 11-keto-17α-methyltestosterone, at the 2-position according to methods known in the art [see Ringold and Rosenkranz, J. Org. Chem., 21, 1333 (1956)] and as more fully described in Preparation 1 hereinafter. 11β-hydroxytestosterone, 11-ketotestosterone, 11β-hydroxy-4-androstene - 3,17 - dione, and 4-androstene-3,11,17-trione are well known in the art [see Herr and Heyl, J.A.C.S., 75, 5927 (1953)]. 11-keto-17α-methyltestosterone may be prepared as disclosed in U.S. Patent 2,678,933. 11β-hydroxy-17α-methyltestosterone can be prepared from 11-keto-17α-methyltestosterone according to techniques well known in the art, e.g., ketalization with ethylene glycol in the presence of p-toluenesulfonic acid to produce the 3-ethylene ketal thereof which compound is then reduced, e.g., with lithium aluminum hydride, and finally the protecting 3-ketal group is hydrolyzed with acid to regenerate the 3-ketone.

According to the process of the present invention the 4-double bond of a 2α-methyl-11-oxygenated-17-oxygenated-4-androsten-3-one such as, 2α-methyl-11β-hydroxytestosterone, 2α-methyl - 11 - ketotestosterone, 2α-methyl-11β-hydroxy-4-androstene-3,17-dione, 2α-methyl-4-androstene-3,11,17-trione, 2α-17α-dimethyl-11β-hydroxytestosterone, and 2α,17α-dimethyl-11-ketotestosterone, is reduced to give the corresponding saturated compounds, i.e., 2α - methyl - 11β,17β - dihydroxy-5α-androstan-3-one, 2α - methyl - 17β - hydroxy-5α-androstane-3,11-dione, 2α-methyl-11β-hydroxy-5α-androstane-3,17-dione, 2α-methyl-5α-androstane - 3,11,17 - trione, 2α,17α-dimethyl-11β,17β-dihydroxy-5α-androstan-3-one, and 2α,17α-dimethyl-17β-hydroxy-5α-androstane-3,11-dione.

The reduction can be accomplished either by hydrogenation with hydrogen in the presence of a catalyst such as palladium supported on charcoal, barium sulfate, zinc oxide, calcium carbonate, and the like, or by a metal such as, for example, lithium in liquid ammonia.

The hydrogenation is usually conducted in a solvent medium. Alkanols, hexane, acetone, methyl ethyl ketone, dioxane, acetic acid, ethyl acetate or like organic solvents may be advantageously employed, with tertiary butyl alcohol being preferred. The catalyst can be reduced prior to the introduction of the 2-methyl-Δ⁴-steroid or preferably the steroid, catalyst and supporting media can be contacted together in a solvent medium prior to introduction of the hydrogen. It is not necessary to conduct the reaction under pressure, although, when pressure is utilized, a hydrogen pressure of about one to 100 pounds or more is operative, a pressure of from about ten to 25 pounds is preferred. Any suitable temperature between about zero and 100 degrees centigrade may be employed, with room temperature being satisfactory. Hydrogenation is continued until approximately one molar equivalent of hydrogen has been absorbed. The catalyst is then separated from the solution by filtration and the hydrogenated products separated by conventional separation or extraction procedures.

When reduction is accomplished with a metal such as, for example, lithium, sodium, potassium, and the like, with lithium being preferred, the reaction is conducted in liquid ammonia for a period of a few minutes to about four hours. A solvent such as, for example, ether, tetrahydrofuran, methylene chloride and the like, or mixtures thereof, may be employed if desired. On completion of the reaction, the reaction mixture is acidified, preferably by addition of ammonium chloride, the ammonia is allowed to evaporate, and the product is isolated by conventional procedures such as filtration or extraction with an organic solvent. Purification by chromatography and recrystallization may be employed if desired.

The thus produced 2α-methyl-11-oxygenated-17-oxygenated-5α-androstan-3-one compounds are reduced at the 3-position with a chemical carbonyl reducing agent in an organic solvent, e.g., ethanol, methanol, isopropyl alcohol, and tetrahydrofuran, to produce the corresponding 3-hydroxy compounds, i.e., 2α-methyl-5α-androstane-3,11β,17β-triol, 2α-methyl-3,17β-dihydroxy-5α-androstan-11-one, 2α-methyl-3,11β-dihydroxy-5α-androstan-17-one, 2α-methyl-3-hydroxy-5α-androstane-11,17-dione, 2α,17α-dimethyl-5α-androstane-3,11,17β-triol, and 2α,17α-dimethyl-3,17β-dihydroxy-5α-androstan-11-one.

Reducing agents such as an alkali metal borohydride or an alkali metal aluminum hydride, e.g., sodium borohydride, lithium aluminum hydride, lithium borohydride, and the like are operative. The temperature of the reaction mixture is usually maintained between about zero and about 100 degrees centigrade with temperature between about room temperature and the reflux temperature of the reaction mixture being preferred for a period varying from a few minutes to several hours. If the compound being reduced at the 3-position has additional ketone groups at the 11- or 17-positions, or both, the reduction must be done selectively, such as, for example, by limiting the amount of reducing agent, preferably sodium borohydride, in order to avoid reduction of the 11- and 17-keto groups. After the completion of the reaction, the reaction mixture is preferably mixed with water or an acid to decompose any excess reducing agent and organo-metal complexes. The product is isolated by known methods such as, for example, filtration or extraction with an organic solvent.

The compounds of this invention, represented by Formula I, may be utilized either as the free alcohols or as the esters. Acylation of the hydroxyl groups either at the 3- or 17-positions when such hydroxyl groups are present at those positions, is accomplished by allowing the hydroxy compounds to react with the anhydride of an organic carboxylic acid, preferably a hydrocarbon carboxylic acid containing from one to twelve carbon atoms, inclusive, for example, a saturated straight-chain aliphatic acid, e.g., acetic, propionic, butyric, valeric, hexanoic, lauric, a saturated branched-chain aliphatic acid, e.g., trimethylacetic, isobutyric, isovaleric, a cyclo- aliphatic saturated acid, e.g., cyclohexane-carboxylic acid, an alkaryl acid, e.g., phenylacetic, phenylpropionic, o-, m-, and p-toluic, a saturated dibasic acid (which can be converted into water-soluble, e.g., sodium salts), e.g., succinic, adipic, a monobasic unsaturated acid, e.g., acrylic, crotonic, undecylenic, propiolic, cinnamic, a dibasic unsaturated acid (which can be converted into water-soluble, e.g., sodium salts), e.g., maleic and citraconic. Illustrative of the esters thus produced are the 3-monoacylates such as, for example, 2α-methyl-3-11β-dihydroxy-5α-androstan-17-one 3-acetate, 2α-methyl-3,11β-dihydroxy-5α-androstan-17-one 3-propionate, 2α-methyl-3-hydroxy-5α-androstan-11,17-dione 3-hemisuccinate, the 17-monoacylates such as, for example, 2α-methyl-11β,17β-dihydroxy-5α-androstan-3-one 17-acetate, 2α-methyl-11β,17β-dihydroxy-5α-androstan-3-one 17-isovalerate, 2α-methyl-17β-hydroxy-5α-androstan-3,11-dione 17-propionate, 2α-methyl-11β,17β-dihydroxy-5α-androstan-3-one 17-maleate; the 3,17-diacylates such as, for example, 2α,17α-dimethyl-5α-androstane-3,11β,17β-triol 3,17-diacetate, 2α,17α-dimethyl-5α-androstane-3,11β,17β-triol 3,17-dipropionate, 2α,17α-dimethyl-5α-androstane-3,11β,17β-triol 3,17-dicrotonate, 2α,17α-dimethyl-5α-androstane-3,11β,17α-triol 3,17-dipropiolate, and the like.

The following examples, illustrative of the products of the present invention and a process for their production, are not to be construed as limiting.

PREPARATION 1.—2α-METHYL-11β-HYDROXY-17α-METHYLTESTOSTERONE

A. 2-Ethoxyoxalyl-11β-Hydroxy-17α-Methyltestosterone

To a solution of 3.18 grams (0.01 mole) of 11β-hydroxy-17α-methyltestosterone and 2.9 milliliters of diethyl oxalate dissolved in 45 milliliters of tertiary butyl alcohol at fifty degrees centigrade was added, with stirring, 3.4 milliliters of a 24 percent solution of sodium methoxide in absolute methanol. After twelve minutes, 150 milliliters of ether were added and stirring was continued for an additional fifteen minutes. Then the mixture was filtered and the collected precipitate was washed with ether and dried at 25 degrees centigrade at reduced pressure. The dried precipitate was dissolved in forty milliliters of water to which was then added fifteen milliliters of ten percent hydrochloric acid with stirring and cooling. The resulting precipitate was collected by filtration, washed with water and dried to give 3.57 grams, a yield of 85 percent of the theoretical of 2-ethoxyoxalyl-11β-hydroxy-17α-methyltestosterone melting at 120 to 123 degrees centigrade.

B. 2-Ethoxyoxalyl-2-Methyl-11β-Hydroxy-17α-Methyltestosterone

To a cold solution of 3.4 grams of 2-ethoxyoxalyl-11β-hydroxy-17α-methyltestosterone and fifteen milliliters of methyl iodide in thirty milliliters of acetone was added twenty grams of anhydrous potassium carbonate and the resulting mixture was stirred for 64 hours. The mixture was diluted with 300 milliliters of water and then extracted with three 100-milliliter portions of methylene chloride. The combined extracts were washed with water and dried. The methylene chloride was evaporated leaving a glassy residue of 2-ethoxyoxalyl-2-methyl-11β-hydroxy17α-methyltestosterone.

C. 2α-Methyl-11β-Hydroxy-17α-Methyltestosterone

The glassy residue of 2-ethoxyoxalyl-2α-methyl-11β-hydroxy-17α-methyltestosterone described above was dissolved in twenty milliliters of methanol to which was then added two milliliters of a 24 percent solution of methanolic sodium methoxide and the mixture then allowed to stand for three hours at 25 degrees centigrade. The mixture was then diluted with 100 milliliters of water and extracted with three 50-milliliter portions of methylene chloride. The methylene chloride was evaporated leaving 2.8 grams of residue which was redissolved in fifty milliliters of methylene chloride. The solution was then diluted with fifty milliliters of Skellysolve B hexane hydrocarbons and then poured over a chromatographic column of 120 grams of Florisil synthetic magnesium silicate. The column was developed with 250-milliliter portions of solvent of the following fractions, composition and order: four of Skellysolve B plus five percent acetone, fourteen of Skellysolve B plus six percent acetone, five of Skellysolve B plus seven percent acetone and eight of Skellysolve B plus eight percent acetone. The solvent was evaporated from the last Skellysolve B plus seven percent acetone eluate and all but the last Skellysolve B plus eight percent acetone eluates and the combined residual solid, which weighed 1.004 grams, was redissolved in five milliliters of warm acetone to which was then added twelve milliliters of Skellysolve B and the mixture distilled until crystallization commenced. There was thus-obtained 0.587 gram of 2α-methyl-11β-hydroxy-17α-methyltestosterone melting at 217 to 219 degrees centigrade, having an [α]$_D$ of plus 125 degrees (c. 1.0323 in chloroform) and the analysis below:

*Analysis.*—Calculated for $C_{21}H_{32}O_3$: C, 75.86; H, 9.70. Found: C, 75.44. H, 9.78.

Following the procedure of the above preparation, but substituting 11β-hydroxytestosterone, 11-ketotestosterone, 11β-hydroxy-4-androstene-3,17-dione, 4-androstene-3,11,17-trione, or 11-keto-17α-methyltestosterone as starting material therein is productive of 2α-methyl-11β-hydroxytestosterone, 2α-methyl-11-ketotestosterone, 2α-methyl-11β-hydroxy-4-androstene-3,17-dione, 2α-methyl-4-androstene-3,11,17-trione, and 2α,17α-dimethyl-11-ketotestosterone respectively.

EXAMPLE 1.—2α,17α-DIMETHYL-11β,17β-DIHYDROXY-5α-ANDROSTAN-3-ONE

To 500 milliliters of liquid ammonia, which had been dried with traces of lithium until a blue color remained, was added 0.6 gram of lithium followed by a solution of 2α,17α-dimethyl-11β-hydroxytestosterone in thirty milliliters of anhydrous ether and thirty milliliters of tetrahydrofuran. Addition of the 2α,17α-dimethyl-11β-hydroxytestosterone solution was done dropwise over a period of 25 minutes. After stirring for an additional forty minutes the mixture was acidified with the addition of twelve grams of solid ammonium chloride and the ammonia was allowed to evaporate. The residue was diluted with water and extracted with ether. The ether extract was washed with dilute hydrochloric acid and water, dried, and evaporated to dryness to give 5.15 grams of crude solid which was chromatographed over 160 grams of synthetic magnesium silicate. Elution of the column with eight percent acetone in petroleum ether gave 2.81 grams which on recrystallization from ethyl acetate-petroleum ether gave 2.4 grams of 2α,17α-dimethyl-11β,17β-dihydroxy-5α-androstane-3-one as an ethyl acetate solvate which melted at 132 to 150 degress centigrade and had a rotation of [α]$_D$ plus 33 degrees (chloroform) after drying at 100 degrees centigrade.

*Analysis.*—Calculated for $C_{21}H_{34}O_3$: C, 75.40; H, 10.25. Found (dried): C, 75.86; H. 10.29.

EXAMPLE 2.—2α,17α-DIMETHYL-11β,17β-DIHYDROXY-5α-ANDROSTEN-3-ONE

A mixture containing one gram of 2α,17α-dimethyl-11β-hydroxytestosterone, forty milliliters of t-butyl alcohol and 100 milligrams of five percent palladium on charcoal catalyst was hydrogenated with hydrogen at atmospheric pressure. After the theoretical amount of hydrogen was taken up, the hydrogenation was stopped and the catalyst was removed by filtration. The filtrate was concentrated to dryness and the residue was chromatographed over synthetic magnesium silicate and recrystallized from ethyl acetate-petroleum ether to give 2α,17α - dimethyl - 11β,17β - dihydroxy - 5α - androstan - 3-one, identical with that obtained in Example 1.

Following the procedure of Example 2, but substituting 2α-methyl-11β-hydroxytestosterone, 2α-methyl-11-ketotestosterone, 2α-methyl-11β-hydroxy-4-androstene-3,17-dione, 2α-methyl-4-androstene-3,11,17-trione, or 2α,17α-dimethyl-11-ketotestosterone as starting material therein is productive of 2α-methyl-11β,17β-dihydroxy-5α-androstan-3-one, 2α-methyl-17β-hydroxy-5α-androstane-3,11-dione, 2α - methyl - 11β - hydroxy - 5α - androstane - 3,17 - dione,2α-methyl-5α-androstane-3,11,17-trione, and 2α,17α-dimethyl-17β-hydroxy-5α-androstane-3,11-dione respectively.

EXAMPLE 3.—2α,17α-DIMETHYL-5α-ANDROSTANE-3,11β,17β-TRIOL

A solution containing 1.5 grams of sodium borohydride in twenty milliliters of 0.1 N sodium hydroxide was added to a solution of three grams of 2α,17α-dimethyl-11β,17β-dihydroxy-5α-androstan-3-one in eighty milliliters of ethanol. After twenty minutes of stirring, the mixture was diluted with water and acidified by dropwise addition of dilute acetic acid. The resulting solid precipitate was collected by filtration, washed, and dried to give 2α,17α-dimethyl-5α-androstane-3,11β,17-triol.

Following the procedure above but substituting 2α-methyl-11β,17β-dihydroxy-5α-androstan-3 - one of Example 2 as starting material therein is productive of 2α-methyl-5α-androstane-3,11β,17β-triol.

EXAMPLE 4.—2α-METHYL-3-HYDROXY-5α-ANDROSTANE-11,17-DIONE

Following the procedure of Example 3, reduction of 2α-methyl-5α-androstane-3,11,17-trione of Example 2 with one equivalent of sodium borohydride gave a reduction mixture which was chromatographed over synthetic magnesium silicate using Skellysolve B hexanes plus acetone for elution of the column. The fractions which by infrared analysis showed the absence of a 3-ketone group were combined and recrystallized from acetone to give 2α-methyl-3-hydroxy-5α-androstan-11,17-dione.

Following the procedure above but substituting 2α-methyl-17β-hydroxy-5α-androstane-3,11-dione, 2α - methyl-11β-hydroxy-5α-androstane - 3,17 - dione, or 2α,17α-dimethyl-17β-hydroxy-5α-androstane-3,11-dione as starting material therein is productive of 2α-methyl-3,17β-dihydroxy-5α-androstan-11-one, 2α - methyl-3,11β-dihydroxy-5α-androstan-17-one, and 2α,17α - dimethyl - 3,17β-dihydroxy-5α-androstan-11-one, respectively.

EXAMPLE 5.—2α,17α-DIMETHYL-5α-ANDROSTANE-3,11β,17β-TRIOL 3,17-DIACETATE

One gram of 2α,17α-dimethyl-5α-androstane-3,11β,17β-triol was dissolved in twenty milliliters of acetic anhydride and the solution was heated under reflux for one hour. The excess acetic anhydride was then removed by distillation under reduced pressure and the resulting residue was crystallized from methanol to give 2α,17α-dimethyl-5α-androstane-17β-3,11β-triol 3,17-diacetate.

Similarly, by allowing 2α,17α-dimethyl-5α-androstane-3,11β,17β-triol to react with the appropriate hydrocarbon carboxylic acid anhydride, for example, at temperatures between 100 and 150 degrees centigrade, there are produced other 3,17-diacylates, such as, for example, 2α,17α-dimethyl-5α-androstane-3,11β,17β-triol 3,17-dipropionate, 2α,17α-dimethyl-5α-androstane-3,11β,17β - triol 3,17 - dibutyrate, 2α,17α-dimethyl-5α-androstane-3,11β,17β-triol 3,17 - divalerate, 2α,17α-dimethyl-5α-androstane-3,11β,17β-triol 3,17-dihexanoate, 2α,17α-dimethyl-5α-androstane-3,11β,17β-triol 3,17-dilaurate, 2α,17α-dimethyl - 5α - androstane-3,11β,17β-triol 3,17-di-(trimethylacetate),2α,17α-dimethyl-5α-androstane-3,11β,17β-triol 3,17 - diisobutyrate, 2α,17α-dimethyl-5α-androstane-3,11β-17β-triol 3,17-diisovalerate, 2α-17α-dimethyl-5α-androstane-3,11β,17β-triol 3, 17-dicyclohexane carboxylate, 2α,17α-dimethyl-5α-androstane-3,11β-17β-triol 3,17-dibenzoate, 2α,17α-dimethyl-5α- androstane-3,11β,17β-triol 3,17-diphenyl-acetate, 2α,17α-dimethyl-5α-androstane-3,11β,17β - triol 3,17 - di(β-phenyl)-propionate, 2α,17α-dimethyl-5α-androstane-3,11β,17β-triol 3,17-di(o-, m-, p-toluate), 2α,17α - dimethyl - 5α-androstane-3,11β,17β-triol 3,17-dihemisuccinate, 2α,17α-dimethyl-5α-androstane-3,11β,17β-triol 3,17-dihemiadipate, 2α,17α-dimethyl-5α-androstane-3,11β,17β-triol 3,17 - diacrylate, 2α,17α-dimethyl-5α-androstane-3,11β,17β - triol 3,17-dicrotonate, 2α,17α-dimethyl-5α-androstane-3,11β,17β-triol 3,17-diundecylenate, 2α,17α-dimethyl-5α-androstane-3,11β,17β-triol 3,17- dipropiolate, 2α,17α-dimethyl-5α-androstane-3,11β,17β-triol 3,17-dicinnamate, 2α,17α-dimethyl-5α-androstane-3,11β,17β-triol 3,17 - dimaleate, 2α,17α-dimethyl-5α-androstane-3,11β,17β-triol 3,17-dicitraconate, and the like.

Similarly, acylation, for example, of 2α-methyl-11β,17β-dihydroxy-5α-androstan-3-one, 2α - methyl - 17β - hydroxy-5α-androstane-3,11-dione, 2α-methyl-11β-hydroxy-5α-androstane-3,17-dione, 2α,17α-dimethyl-17β - hydroxy-5α-androstane-3,11-dione, 2α,17α-dimethyl-11β,17β-dihydroxy-5α-androstane-3-one, 2α - methyl-3-hydroxy-5α-androstane-11,17-dione, 2α-methyl-5-androstane-3,11β,17β-triol, 2α-methyl-3,11β-dihydroxy-5α-androstan-17-one, 2α-17α-dimethyl-3,17β-dihydroxy-5α-androstane-11-one, and the like with the appropriate hydrocarbon carboxylic acid anhydride is productive of the corresponding 3,17-diacylates, 17-monoacylate, and 3-monoacylates. The preferred acylates are those corresponding to the acylates described above for 2α,17α-dimethyl-5α-androstane-3,11β,17-triol.

It is understood that the invention is not to be limited to the exact details of operation of exact compounds shown and described, as obvious modifications and equivalents will be apparent to one skilled in the art, and the invention is therefore to be limited only by the scope of the appended claims.

We claim:
1. 2α,17α-dimethyl-5α-androstane-3,11β,17β-triol.
2. 2α,17α-dimethyl-3,17β-dihydroxy-5α - androstan-11-one.
3. 2α,17α-dimethyl-5α-androstane-3,11β,17β-triol 3,17-dipropionate.

4. 2α-methyl-11-oxygenated-17-oxygenated-5α - androstane of the formula:

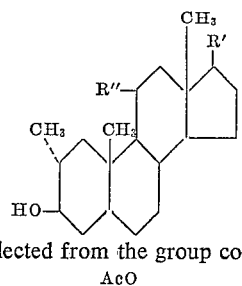

wherein R' is selected from the group consisting of

wherein Ac is the acyl radical of a hydrocarbon carboxylic acid containing from one to twelve carbon atoms, inclusive, and

wherein R" is selected from the group consisting of β-hydrox and keto; and the 3-acylates thereof wherein the acyl radical is that of a hydrocarbon carboxylic acid containing from one to twelve carbon atoms, inclusive.

References Cited in the file of this patent
UNITED STATES PATENTS
2,842,570    Herr ------------------ July 8, 1958
OTHER REFERENCES Helv. Chim. Acta, Heusler et al., vol. 35, pages 295–307.
Journal of Biological Chemistry, vol. 203, pages 433–451, Levy et al.
Helvetica Chim. Acta, article by Heusler et al., vol. 36, pages 652–60.
Natural Products Related to Phenanthrene, by Fieser et al., 3rd ed. (1949), page 424.
Archives of Biochem. and Biophys., article by Caspi et al., vol. 52 (1954), pages 478–483 relied on.